G. R. MARSICO.
CLUTCH.
APPLICATION FILED OCT. 2, 1918.
1,341,993.
Patented June 1, 1920.
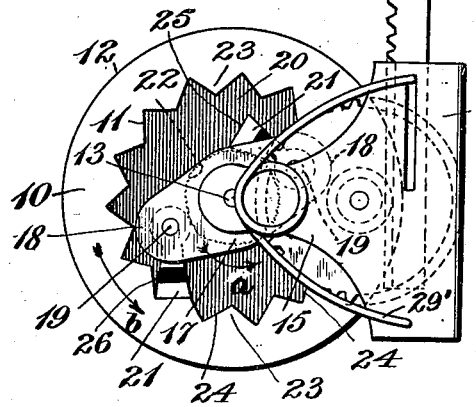
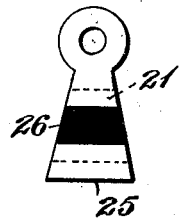
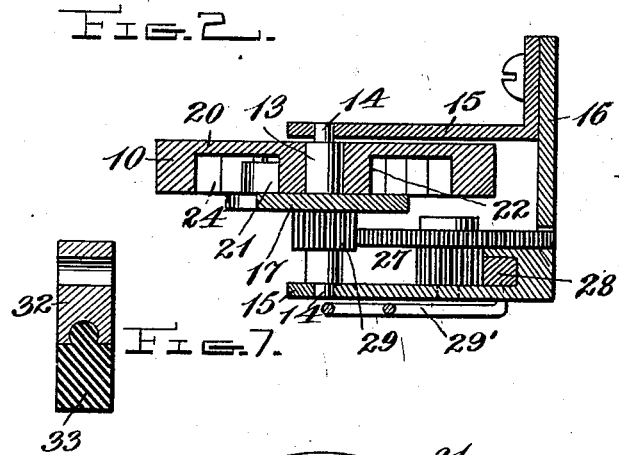
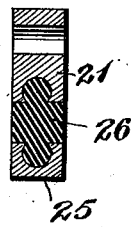
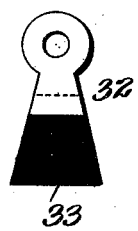
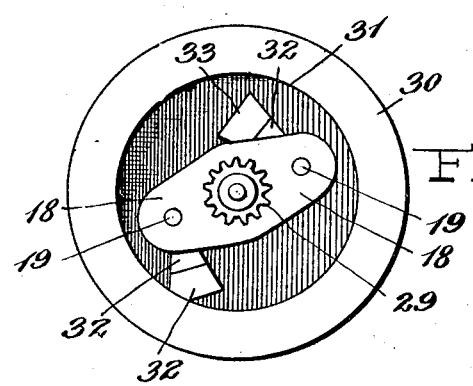
INVENTOR.
Gerard R. Marsico

UNITED STATES PATENT OFFICE.

GERARD R. MARSICO, OF BROOKLYN, NEW YORK.

CLUTCH.

1,341,993.  Specification of Letters Patent.  Patented June 1, 1920.

Application filed October 2, 1918. Serial No. 256,582.

*To all whom it may concern:*

Be it known that I, GERARD R. MARSICO, citizen of the United States, and resident of Brooklyn, in the county of Kings and State of New York, have invented certain new and useful Improvements in Clutches, of which the following is a specification.

This invention relates to clutches and operating mechanism therefor and has for its primary object the provision of a clutch surface adapted to constitute a part of a revolubly mounted member which is arranged to be positively driven and then disposed relatively of its driven means so that it may freely revolve by inertia; embodying with said member, a movable clutch element or dog adapted to mate with said surface to give initial impetus to the member when the driven means is moved in one direction and to be then automatically rendered inactive or free with relation to said surface when the driven means is operated in a reverse direction.

Another object of the invention relates to a clutch mechanism adapted to form a part of a relatively heavy revoluble body, and co-acting revolving and radially movable means for temporarily gripping the member near the extreme periphery thereof to maximize or augment its force of leverage power against the member when rotating the latter in one direction.

A still further object of the invention resides in the provision of a revolving member having an annular clutch surface, and swinging driven elements adapted to co-act with said surface to positively drive said member in one direction, and means for yieldingly causing a broad and uniform impingment of said elements against said surface.

Another object of said invention relates to the provision of a revolving member having an annular clutch surface, revolubly mounted swinging one-way-clutch-elements co-acting with said surface and adapted to be temporarily fixed thereto, and means for accelerating the active swinging movements of said elements with relation to the said clutch surface of the member so as to insure a positive driving thereof when revolving motion in one direction is imparted to said elements.

In the drawings:—

Figure 1 is a side view of the device.

Fig. 2 is a horizontal section therethrough.

Fig. 3 is a side view of one of the swinging and revolving clutch elements.

Fig. 4 is a vertical section therethrough.

Fig. 5 is a view similar to Fig. 1 showing a slightly modified form of the invention.

Fig. 6 is a side view of one of the swinging and revolving clutch elements of the form of the invention illustrated in Fig. 5 and, Fig. 7 is a vertical section therethrough.

The device essentially consists of a relatively heavy substantially cylindrical wheel or member 10 having an internal clutch surface 11 immediately next to the peripheral surface 12, this location of said clutch surface being preferred in order that the force of leverage power of the mating clutch elements to be herein described, may be augmented. This feature will be understood upon observing that the member or wheel 10 is of that type capable of revolving by its own inertia after driving force is applied thereto.

In view of the above, the wheel or member is mounted to revolve on an independent axle or support 13 having reduced ends 14 supported in bearing arms 15—15 of a frame 16. On the axle is a hanger 17 having oppositely extending arms 18—18 provided with pins 19 which extend toward the closed side 20 of said wheel and from which pins, are supported pivoted dogs or clutch elements 21. These dogs or elements are disposed substantially at a tangent to the axle 13, and as shown, they extend in the same common direction relatively of the clutch surface 11 so as to act in one way thereagainst in a manner to be hereinafter explained. When the elements are located above the horizontal center of the axle 13 they are adapted to rest gravitationally and freely against an annular rough stop surface formed on the periphery of a collar or hub member 22 formed on the wheel 20 at the center thereof. In this manner, the mentioned elements will be held against possible binding action and in consequence thereof an effective correlation thereof with the clutch surface 11 will be assured when it will be desired to transmit motion to said wheel.

The clutch surface of the wheel as shown in Figs. 1 and 2 consists of an annular set of substantially V-shaped teeth 23 having broad bearing surfaces 24. The elements 21 are provided with corresponding broad faces 25 adapted to co-engage with the faces 24. Partly through the action of gravity and partly by centrifugal force, the elements 21 are adapted to find effective clutch contact with said teeth when motion in one direction is transferred to said axle 13. In order to further assure full contact between the forces 24 and 25, I find it advantageous to form part of each element 21 of elastic material 26, such as rubber, the faces 25 in the preferred form of the invention being formed of hard steel.

I do not wish to limit myself to any particular means for transmitting motion to the axle to respectively render the elements 21 active and inactive, but as an illustration of an approved mechanism, use is made of a gear train 27 which includes a sliding actuating rack bar 28 and a pinion 29, the latter mounted fixedly on the shaft 13 and the former free to slide in the frame 16. This provides means for revolving the axle respectively in two directions. In order to restore the rack bar to a starting position after the requisite impetus is given the wheel, use is made of a suitable spring 29' having one end fixed to the frame 16 and the other end suitably connected with said sliding rack bar.

Incident to the described arrangement and combination of parts it will be appreciated that when pressure in a downward direction is brought against the rack bar 28, power will be transmitted to the element hanger or support 17 to positively turn the same in the direction of the arrow $a$ indicated in Fig. 1. Due to the fact that the wheel 10 is independent of the supporting axle 13, which latter constitutes a fixed part of the hanger 17, it follows that when motion is initially conducted to the hanger and axle, the swinging elements 21 will be first moved circumferentially of the rough surface 22 of the wheel 10, and then, partly by gravity and partly through centrifugal force said elements will be thrown either singly or collectively into gripping contact with the clutch surface of the wheel. These niceties augment the action of the elements with relation to the clutch surface of the wheel and a positive operation with an application of great leverage force will be applied against said wheel. This is not only necessary in order to effect co-acting relation between the respective clutch surfaces but to enable the wheel 10 to effectually revolve in an unretarded manner against any object with which it may be brought, such as for instance when the wheel is supplied with some well known form of ratchet surface capable of acting against the anvil of the diaphragm of a warning signal. The moment pressure is released from the rack bar the actuating instrumentalities and the normally idle axle 13 assume their initial or starting positions under the influence of the spring 29, while the wheel 10 continues to revolve by inertia in the direction of the arrow $b$ in Fig. 1.

In the form of the invention shown in Figs. 5, 6 and 7, the wheel 30 is provided near its periphery with a relatively smooth annular clutch surface 31 and mating clutch elements 32, the latter having their effective clutch surfaces 33 formed of rubber. This arrangement is found very effective as in practice, the canted action of the surfaces 33 and the impingment thereof against the surface 31 form a broad point of contact between the respective parts and possibility of relatively slipping action is reduced to a minimum.

What I claim is:—

1. In a clutch mechanism of the character described, the combination of a shaft, a rotor freely revoluble on said shaft and having an annular clutch surface at or near the periphery thereof, an annular collar or hub member on the rotor having a roughened peripheral surface, a hanger carried by the shaft and having arms projecting radially toward said clutch surface and beyond diametrically opposite sides of the collar or hub member, pins carried by said radial arms, swinging dogs adapted for clutching engagement with said clutch surface, said dogs having substantially circular heads pivotally engaging said pins and arranged in contact with said roughened peripheral surface for rolling engagement therewith, and means for revolving said shaft.

2. In a clutch mechanism of the character described, the combination of a shaft, a hollow rotor open at one side and comprising a disk having a hub portion and a rim portion projecting from one side thereof, said hub portion being journaled on said shaft and said rim portion being provided with an annular clutch surface, a hanger carried by the said shaft adjacent to the open side of the rotor and having arms projecting radially toward said rim and beyond the said hub, pins extending between the disk and hanger arms across the interior of the rotor, swinging dogs adapted for clutching engagement with said clutch surface, said dogs having substantially circular heads pivotally engaging said pins and in rolling frictional contact with the periphery of the hub, and means for revolving said shaft.

3. In a clutch mechanism of the character described, the combination of a shaft, a rotor comprising a disk having a hub portion and a rim portion projecting from one side thereof, said hub portion being journaled on said shaft and said rim portion being provided with an annular series of clutch teeth on the inner periphery thereof, a hanger carried by the shaft at the side of the rotor opposite said disk and having arms projecting toward said rim portion and beyond said hub portion, pins extending between the disk and hanger arms across the space between the hub and rim portions, dogs arranged in said space and having outer end portions to engage the ratchet teeth and inner end portions formed with substantially circular heads pivotally engaging said pins and peripherally engaging the periphery of the hub portion, and means for revolving said shaft.

4. In a clutch mechanism of the character described, a shaft, a rotor freely revoluble on the shaft and having an annular clutch surface at or near the periphery thereof, a hanger fixed to the shaft, linearly elastic swinging dogs pivoted to the hanger for yielding clutching engagement with the clutch surface of the rotor, and means for imparting driving motion to the shaft.

5. In a clutch mechanism of the character described, a shaft, a rotor freely revoluble on said shaft, clutch devices for imparting motion in one direction to the rotor, a gear train for actuating said clutch devices, a rack plunger connected with said gear train, and an expansion spring of substantially U-shape having one arm supported from a stationary point and the other secured to said rack plunger, whereby the latter will be held at the limit of its movement in one direction.

Signed at Brooklyn, in the county of Kings and State of New York this 20th day of September, A. D. 1918.

GERARD R. MARSICO